(12) United States Patent
Lecolier et al.

(10) Patent No.: US 7,435,768 B2
(45) Date of Patent: Oct. 14, 2008

(54) FOAMED CEMENT SLURRY

(75) Inventors: Eric Lecolier, Chaville (FR); Annie Audibert, Croissy sur Seine (FR); Alain Rivereau, Rueil Malmaison (FR)

(73) Assignee: Institute Francais du Petrole, Malmaison Cedex (FR)

( * ) Notice: Subject to any disclaimer, the term of this patent is extended or adjusted under 35 U.S.C. 154(b) by 434 days.

(21) Appl. No.: 11/230,641

(22) Filed: Sep. 21, 2005

(65) Prior Publication Data

US 2006/0217463 A1    Sep. 28, 2006

(30) Foreign Application Priority Data

Sep. 29, 2004  (FR) .................... 04 10329

(51) Int. Cl.
*C04B 24/24* (2006.01)
*C04B 24/16* (2006.01)

(52) U.S. Cl. .............................. 524/5; 524/4
(58) Field of Classification Search ......... 524/4, 524/5

See application file for complete search history.

(56) References Cited

U.S. PATENT DOCUMENTS

| | | | | |
|---|---|---|---|---|
| 4,210,455 A | * | 7/1980 | Metcalf et al. | 106/727 |
| 4,662,943 A | * | 5/1987 | Baker et al. | 106/720 |
| 5,339,902 A | * | 8/1994 | Harris et al. | 166/293 |
| 5,529,123 A | * | 6/1996 | Carpenter et al. | 166/293 |
| 5,806,594 A | * | 9/1998 | Stiles et al. | 166/293 |
| 6,257,336 B1 | * | 7/2001 | Audibert et al. | 166/293 |
| 6,500,253 B2 | * | 12/2002 | Norman et al. | 106/726 |
| 6,710,107 B2 | * | 3/2004 | Audibert et al. | 524/5 |
| 2006/0075932 A1 | * | 4/2006 | Lecolier et al. | 106/677 |

FOREIGN PATENT DOCUMENTS

| | | |
|---|---|---|
| EP | 1069091 | 1/2001 |
| FR | 2770517 | 5/1999 |
| FR | 2804953 | 8/2001 |
| GB | 2213850 | 8/1989 |

* cited by examiner

*Primary Examiner*—Peter Szekely
(74) *Attorney, Agent, or Firm*—Antonelli, Terry, Stout & Kraus, LLP.

(57) ABSTRACT

The present invention relates to a formulation of a foamed cement slurry comprising in combination:
  at least one hydraulic binder from the group consisting of class G Portland cements, class H Portland cements, aluminous cements whose alumina content is at least above 30% by mass, sulfoaluminous cements and plasters,
  water whose proportion ranges between 20% and 60% by mass in relation to the mass of hydraulic binder,
  a foaming agent whose proportion ranges between 1% and 20% by mass in relation to the mass of hydraulic binder, the foaming agent being a hydrosoluble polymer comprising hydrophobic links, or a mixture of such polymers.

9 Claims, 2 Drawing Sheets

FOAMED CEMENT SLURRY

FIELD OF THE INVENTION

The present invention relates to the sphere of formulations of cementing material slurries.

BACKGROUND OF THE INVENTION

Oil well cementing is a complex operation with multiple goals: mechanically secure the casing strings in the geologic formation, isolate a producing layer from adjacent layers, protect the strings against the corrosion due to the fluids contained in the layers crossed through. Under certain hydrocarbon reservoir development or geothermal conditions, it is essential to have cementing materials with low densities. In fact, when the formations drilled are fragile and unconsolidated, it is impossible to carry out operations with a cement slurry of conventional density, of about 1900 kg/m$^3$, for fear of exceeding the drilled formation fracture pressure, which leads to considerable losses in the formation. This case is notably encountered when cementing the casing of offshore wells or of wells drilled in depleted mature fields.

In order to lower the density of cementing slurries, it is common practice to increase either the amount of water or the amount of gas. When the material is lightened by increasing the amount of water, this high water proportion generates a high porosity which translates into poor properties of the cement sheath in terms of permeability, mechanical strength, cracking and durability. When the solution selected consists in lightening the slurry using gas, there are two options. The first solution consists in adding hollow balls in the formulation of the cementing material. This technique is illustrated by documents U.S. Pat. No. 3,804,058, U.S. Pat. No. 4,252,193 and U.S. Pat. No. 5,019,976. The second solution consists in intentionally driving a large amount of gas into the cement slurry so as to cause it to foam. This technique is illustrated by documents U.S. Pat. No. 5,806,594 and U.S. Pat. No. 5,484,019. This cementing material is then referred to as foamed cement. The quality of the foamed cement represents the volume fraction of gas present in the slurry. Foamed cements with qualities that do generally not exceed 80% are used for cementing with foamed cement. For the success of cementing with foamed cement, it is particularly important to check that the foaming agent used allows to obtain foam qualities compatible with the desired density (this characteristic is referred to as "foamability" of the cement slurry).

Furthermore, the foam obtained has to be stable (this characteristic is referred to as foam "stability"). In fact, unstable cement foams will lead to the formation of a highly irregular cementing material where the pores of the porous structure are greatly connected, and which is therefore very permeable. The stability of the foamed cement is thus essential to obtain high-quality cementing meeting all the requirements relative to oil and gas well cementing.

To obtain foamability and stability of the foam of cementing materials (cement paste, mortars or concretes), a foaming agent (or a mixture of foaming agents) and foam stabilizing additives are generally used in combination. It is essential to correctly select the foaming agents and the foam stabilizing additives. The following criteria to be taken into account can be mentioned: efficiency in terms of foamability and stabilization of the foam, effect on the mechanical strengths and the permeability.

The foaming agents commonly used for foaming cement slurries are anionic surfactants or a mixture of surfactants. For example, it is well-known that a mixture of anionic surfactants and of non-ionic surfactants is efficient to obtain stable foams. The foam stabilizing additives can be either surfactants or polymers, long-chained alcohols, in liquid form or in solid particles.

One difficulty in foaming a cement material lies in the fact that the interstitial solution of these cement materials has a high pH value, often ranging between 12 and 13, and high ionic concentrations notably due to the calcium ions concentration. It is well-known that the surfactants used as foaming agents have a low efficiency with a basic pH value. It is also known that the presence of multivalent ions such as, for example, the calcium resulting from the dissolution of cement in water, has the effect of precipitating the anionic surfactants. In this case, the surfactants that have precipitated can no longer take part in the formation of the foam. One understands that foaming a cement slurry is not a trivial operation and that it is not simple to obtain stable good-quality foams.

The present invention aims to use hydrosoluble polymers comprising hydrophobic links for foaming cement slurries so as to obtain stables foams of good quality.

SUMMARY OF THE INVENTION

In general terms, the present invention relates to a cementing material comprising:
  at least one hydraulic binder from the group consisting of class G Portland cements, class H Portland cements, aluminous cements whose alumina content is at least above 30% by mass, sulfoaluminous cements and plasters,
  water whose proportion ranges between 20% and 60% by mass in relation to the mass of hydraulic binder,
  a foaming agent whose proportion ranges between 0.2% and 20% by mass in relation to the mass of hydraulic binder, the foaming agent being a hydrosoluble polymer referred to as "associative polymer", comprising hydrophobic units.

According to the invention, the hydrosoluble polymer can be a polymer with hydrophilic units Hy and hydrophobic units Hb containing C1 to C30 alkyl, aryl, alkyl-aryl groups. This hydrosoluble polymer can have a molecular mass of between $10^4$ and $5 \times 10^6$ daltons and a proportion of hydrophobic units Hb ranging between 0.5 and 60%. The foaming agent can be a mixture of hydrosoluble polymers comprising hydrophobic units.

The cementing material according to the invention also comprises a hydrosoluble polymer thinning agent whose proportion ranges between 0.1% and 8% by mass in relation to the mass of hydraulic binder, the hydrosoluble polymer thinning agent being selected from the group consisting of: a polynaphthalene sulfonate, a polycarboxylate and a polyoxyethylene polycarboxylate.

The proportion of water in the material according to the invention can range between 35% and 50% by mass in relation to the mass of hydraulic binder.

The cementing material according to the invention can further comprise a retarding agent for controlling the setting time of the material.

The cementing material according to the invention can further comprise an accelerating agent for controlling the setting time of the material.

The cementing material according to the invention can be used for cementing an oil well.

The present invention also relates to the use of a hydrosoluble associative polymer comprising hydrophobic units for foaming a cement slurry comprising:

at least one hydraulic binder from the group consisting of class G Portland cements, class H Portland cements, aluminous cements whose alumina content is at least above 30% by mass, sulfoaluminous cements and plasters, water whose proportion ranges between 20% and 60% by mass in relation to the mass of hydraulic binder, the proportion of associative polymer ranging between 0.2% and 20% by mass in relation to the mass of hydraulic binder.

The invention also provides a method of producing a foamed cement slurry wherein the following stages are carried out:

mixing a hydraulic binder with water so as to obtain a cement slurry, the hydraulic binder being selected from the group consisting of class G Portland cements, class H Portland cements, aluminous cements whose alumina content is at least above 30% by mass, sulfoaluminous cements and plasters, and the proportion of water ranges between 0.2% and 20% by mass in relation to the mass of hydraulic binder, introducing a foaming agent in the cement slurry, the proportion of foaming agent ranging between 0.2% and 20% by mass in relation to the mass of hydraulic binder, the foaming agent being a hydrosoluble polymer comprising hydrophobic units, pumping the cement slurry comprising the foaming agent, and injecting a gas into the cement slurry comprising the foaming agent and stirring the mixture of slurry and of gas so as to foam the slurry and to obtain a foamed cement slurry.

Thus, the foamed cements obtained from the formulations according to the present invention allow to carry out all the cementing operations required in the case of wells drilled in low-cohesion formations or formations wherein the fracture pressures are low. The foamed cements according to the invention can also be used for cementing cavernous, fault zones and more generally zones where fluid losses occur during drilling.

BRIEF DESCRIPTION OF THE FIGURES

Other features and advantages of the invention will be clear from reading the description hereafter, with reference to FIGS. 1 and 2 showing diagrams that compare foamed cements according to the invention with conventional foamed cements, and to FIG. 3 which diagrammatically shows a method of producing a foamed cement slurry according to the invention.

DETAILED DESCRIPTION

Figure 1:
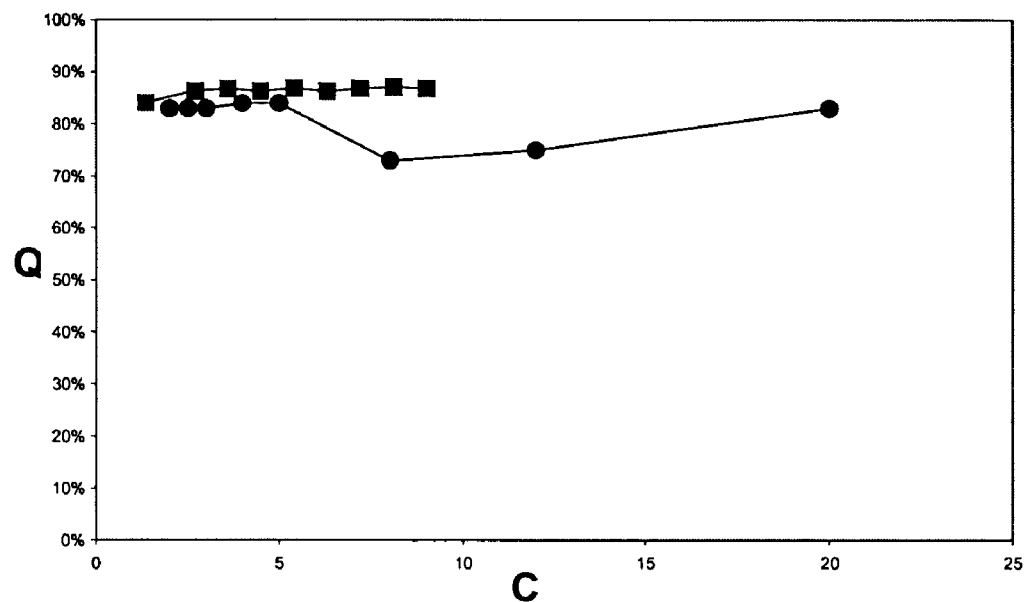

According to the invention, cement foams having a good "foamability" and a good "stability" were obtained by combining the following constituents:

a hydraulic binder from the group consisting of the Portland cements or other hydraulic binders (for example aluminous cement whose alumina content is above 30% or sulfoaluminous cement, or plaster), water in proportions ranging between 20% and 60%, preferably between 35% and 50%, a foaming agent consisting of hydrosoluble polymers comprising hydrophobic units, commonly referred to as "associative polymers", whose chemical structure is explained hereafter, possibly a setting accelerating agent, possibly a setting retarding agent, possibly a superplasticizing agent, also referred to as hydrosoluble thinning agent, in proportions ranging between 0.1% and 8% by weight in relation to the hydraulic binder (the molecules can be a polynaphthalene sulfonate, a polycarboxylate or a poly-oxyethylene polycarboxylate), and possibly a foam stabilizing additive.

The Portland cements can be Black Label, HTS or CEMOIL cement manufactured by the Dyckerhoff, Lafarge and CCB Companies respectively. The aluminous cements can be the Secar 51 or Temal cements manufactured by the Lafarge Aluminates Company.

The foaming agent is an associative polymer. It can be in a proportion ranging between a minimum critical concentration Ccritical and 20% by mass in relation to the mass of hydraulic binder. Ccritical is a minimum concentration below which it is not possible to obtain a stable foam. This minimum critical concentration is specific to the molecule selected. Generally, Ccritical is greater than 0.2%, preferably 0.5% or 1%, sometimes 2% by mass in relation to the mass of hydraulic binder.

The associative polymers used in the composition of the cement slurry according to the invention can be a polymer with hydrophilic (Hy) and hydrophobic (Hb) units in aqueous solution, the hydrophobic units (Hb) containing C1 to C30 alkyl, aryl, alkyl-aryl groups, the polymer having the following structure —(Hb)—(Hy)— with a statistical distribution with:

Hy of the form:

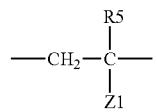

where R5 is H or $CH_3$, Z1 is COOH or $CONH_2$ or $CONHR1SO^{3-}$ or CONHR"1, R"1 is $CH_3$, or of the form:

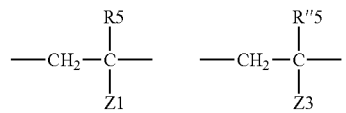

where R5 is H or $CH_3$, Z1 is $CONH_2$ or CONHR"1, R"1 is $CH_3$ and R"5 is H or $CH_3$, Z3 is COOH or $CONHR1SO^{3-}$, and where R1 is $C_3H_8$ or $C_6H_5$, Hb is of the form:

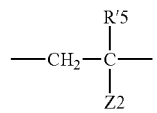

where R'5 is H or $CH_3$ and Z2 is COOR7, COOR'1, CONR1R'1 or CONR1R7, R7 being a non-ionic surfactant consisting of an alkyl polyoxyethylene chain, R1 is H or a C1-C30 alkyl, aryl or alkyl-aryl radical, and R'1 is a C1-C30 alkyl, aryl or alkyl-aryl radical.

In particular, the polymer can have a molecular mass of between $10^4$ and $5 \times 10^6$ daltons, more particularly between $10^4$ and $1.5 \times 10^6$, and a proportion of hydrophobic units Hb ranging between 0.5 and 60%.

According to the present invention, the associative polymer can also be a derivative of the hydrophilically and hydrophobically modified galactomanane described in patent U.S. Pat. No. 4,960,876. This associative polymer is notably produced by the Lamberti Company and marketed under references HPG19, HPG21, HM21, HM22. The molecular mass of the modified galactomanane can be below $5 \times 10^6$ daltons, preferably below $2 \times 10^6$ daltons. The hydrophobic group can be a linear or branched alkyl radical, saturated or with an ethylene unsaturation, comprising between 10 and 32 carbon atoms, preferably between 12 and 30. Adding to the cement slurry a proportion of hydrophilically and hydrophobically modified galactomanane derivative or a proportion of a mixture of hydrophobically modified hydrosoluble polymers as described above and of hydrophilically and hydrophobically modified galactomanane derivatives allows to obtain cement foams of different densities, lower than the initial density of the cement slurry.

The associative polymer can be selected from the group consisting of:

HMPAM1: where R5 is H and Z1 is $CONH_2$, R'5=$CH_3$, Z2 is COOR'1 with R'1=$C_9H_{19}$, HMPAM2: where R5 is H and Z1 is $CONH_2$, R'5=H, Z2 is CONR'1R'1 with R'1=$C_6H_{13}$, HMPAM3: where R5 is H and Z1 is CONH2, R"5=H, Z3 is COOH or CONHR1SO$_3$, where R1 is $C_3H_8$ (AMPS), R'5=H, Z2 is CONR'1R'1 with R'1=$C_6H_{13}$, S1: where R5 is H and Z1 is $CONH_2$, R'5=H and Z2 is $C_6H_4$ $SO_3H$, HB1: where R5 is H, Z1 is COOH, R'5 is H and Z2 is COOR'1 with R'1=$C_4H_9$.

In particular, the polymer called HMPAM1 or HMPAM2 or HMPAM3 can have a molecular mass of between $5 \times 10^5$ daltons and $2 \times 10^6$ daltons, and a proportion of hydrophobic units (Hb) ranging between 0.5 and 3%.

Polymer S1, an acrylamide (Hy)/styrene sulfonate (Hb) copolymer, branched or not, according to the description above can have a molar ratio of about 50/50 and a molar mass ranging between $5 \times 10^5$ daltons $5 \times 10^6$ daltons. If it is branched, it is referred to as S2. The branching agent used in this case can be N, N' methylene bis acrylamide MBA.

Polymer HB1, an acrylate (Hy)/butyl acrylate (Hb) copolymer, with R5 being H, Z1 COOH, R'5H and Z2 COOR'1 with R'1 C4, can comprise between 50% and 80% acrylate units, and have a molecular mass of between $10^4$ and $5 \times 10^6$ daltons, preferably between $10^4$ and $5 \times 10^4$ daltons.

The foaming agent can be a mixture of various associative polymers.

The cement slurry according to the invention is very fluid. According to circumstances, there may be an absence of yield point, i.e. the cement flows only under the effect of the gravity force. This fluidity can be the cause for a lack of stability of the cement foam. The associative polymer allows the foam stability to be improved. This associative polymer allows to increase the viscosity of the slurry, which has the effect of limiting coalescence of the gas bubbles.

Furthermore, the formulation of the cementing material according to the invention can comprise a retarding agent allowing to retard the setting time of the cement slurry.

The retarding agents can be organic products or water-soluble mineral materials.

Among the organic products, the following molecules can be distinguished:

(calcium, sodium) lignosulfonates whose sugar proportions are below 20%, acids and salts (sodium, potassium, calcium) of hydroxy-carboxylic acids, oxalic and gluconic acids, efficient with very low dosages, sodium gluconate of formula $CH_2OH(CHOH)_4COONa$ is very active for retarding materials containing hydraulic binders, calcium gluconate, carbon hydrates of general formula $C_n(H_2O)_n$; among these molecules, the saccharose of formula $C_{12}H_{22}O_{11}$ is very efficient; it is also possible to use glucoses $(C_6H_{12}O_6)$, starch $(C_6H_{10}O_5)_n$, and cellulose, corn syrup.

These organic products can be used in dosages ranging between 0.1% and 5% by mass of dry extract in relation to the mass of hydraulic binder.

Among the retarding agents based on mineral salts, the following products can be used:

boron compounds used with very low dosages to retard the cementing materials; boric acid ($BO_3H_3$), borax ($Na_2B_4O_7$ $10H_2O$), sodium metaborate $Na_2B_2O_4$ and sodium tetraborate ($Na_2B_4O_7$) can be preferably used, tin sulfate ($S_2SO_4$), lead acetate ($Pb(C_2H_3O_2)_2$), calcium monophosphate ($Ca(H_2PO_4)_2$).

These retarding agents based on mineral salts can be used with dosages ranging between 0.1% and 2% by mass in relation to the mass of hydraulic binder.

Furthermore, the formulation of the cementing material according to the invention can comprise an accelerating agent allowing to accelerate the setting time of the cement slurry. This accelerating agent can be used for cementing zones with low temperatures between −4° C. and 10° C. For example, the zones close to the sea bottom in deep-sea drilling can be at temperatures of about 4° C. The accelerating agents can be selected from among the following products:

calcium chloride ($CaCl_2$), calcium nitrite ($Ca(NO_2)_2$), calcium formiate ($Ca(HCO_2)_2$).

These products can be used at concentrations ranging between 0.5% and 5% by mass in relation to the mass of hydraulic binder. For temperatures below 15° C., calcium chloride should not be used at concentrations above 2.5% in relation to the mass of cement. Above this concentration, it behaves like a setting retarding agent used under low-temperature conditions.

Non-chlorinated accelerating agents available on the market can also be used.

To show the efficiency of associative polymers for the production of a foam of hydraulic binders, we carried out tests by foaming basic saline solutions whose composition is identical to that of the interstitial solution of the Portland cements. These basic saline solutions were obtained by filtering a cement slurry and by recovering the filtrate.

In general terms, a foam can be characterized by the following two characteristics: quality Q and drainage rate Vd.

Quality Q represents the volume fraction of gas in the foam and it is expressed by $$Q = \frac{V_{foam} - V_0}{V_{foam}},$$

where $V_0$ and $V_{foam}$ respectively represent the initial volume of the non-foamed solution and the volume of the foamed solution obtained from the initial solution. The drainage rate represents the velocity of the separation phenomenon between the foam and a liquid phase that is recovered at the bottom of the sample. This quantity allows to quantify the stability of the foam produced. Bikerman has empirically modelled the drainage rate by assuming that drainage was a first-order kinetic phenomenon.

The equation is thus written as follows: $V(t)=V_0(1-e^{-kt})$, where $V(t)$ is the volume of liquid drained, $V_0$ the total volume of the solution that has foamed, t the time and k a constant characteristic of the foam stability.

In practice, the drainage rate $V_d$ of the liquid in the foam is more often determined by putting by definition:

$$V_d = \left[\frac{dV(t)}{dt}\right]_{t_{1/2}},$$

where $t_{1/2}$ corresponds to the time after which half of the liquid initially contained in the foam has been drained ($V(t_{1/2})=V_0/2$). We then have the following relation: $V_d=k\times V_0/2$.

We compare the results obtained, on the one hand, with the associative polymer HB1 and, on the other hand, the results obtained with sodium dodecyl sulfate, commonly referred to as SDS, which is known to be one of the best foaming surfactants. The experiment results are given in the graphs of FIGS. 1 and 2, where the squares represent the values obtained for the solutions foamed with SDS and the circles represent the values obtained for the solutions foamed with HB1.

FIG. 1 shows the variation in the quality Q (expressed in %) of the foam obtained from an interstitial solution containing either SDS or HB1. Quality Q is expressed as a function of the concentration C (in %) of the associative polymer contained in the solution.

Below the minimum critical concentration of HB1, the solution does not foam. For this experiment, the critical concentration is 2%. It can be observed that HB1 allows to obtain foam qualities that are equivalent to those obtained with SDS.

Figure 2:
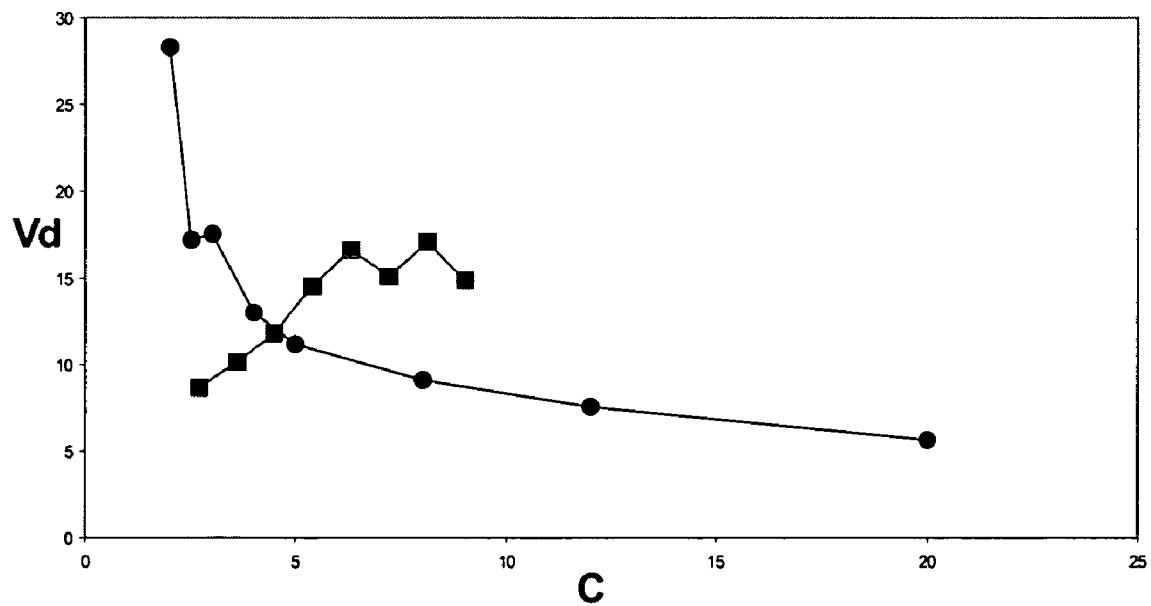

FIG. 2 shows the variation in the drainage rate Vd (in ml/min) of the foam as a function of the SDS or HB1 concentration (in %). It can be noticed that the higher the HB1 concentration, the lower the drainage rate; this is an advantage of the invention because it is possible to reach very low drainage rates, which means that the foams obtained are very stable, whereas for SDS we have the opposite behaviour: the drainage rate increases with the surfactant concentration. It can be seen that, for concentrations above 5%, HB1 allows to formulate foams with drainage rates that are lower than those of the foams obtained with SDS.

The examples given below give the densities measured on foam cement samples having a ratio of the amount of water to the amount of cement E/C=0.44, with various foaming agent concentrations. Class G Portland cement was used for the samples.

Examples of foamed cement densities with various HB1 concentrations (mass percentage of HB1 in relation to the hydraulic binder):

| HB1 concentration (in %) | Foamed cement density (in g/cm$^3$) | Compressive strength (in MPa) |
|---|---|---|
| 1 | Unstable foam | — |
| 2 | Unstable foam | — |
| 3 | 0.9 | 2.54 |

Example of foamed cement density obtained from HPG 19:

Mass percentage of HPG 19=0.22%
Foam cement density=1.86 g/cm$^3$
Compressive strength=21.1 MPa Example of foamed cement density obtained from HPG 21:

Mass percentage of HPG 21=0.22%
Foam cement density=1.81 g/cm$^3$
Compressive strength=21.7 MPa Examples of foamed cement densities obtained from mixtures of hydrophobic modified polymers HM 21 and HB1:

| HM 21 concentration (in %) | HB1 concentration (in %) | Foamed cement density (in g/cm$^3$) | Compressive strength (in MPa) |
|---|---|---|---|
| 0.22 | 0.5 | 1.73 | — |
| 0.22 | 1.0 | 1.11 | 14 |
| 0.22 | 4.0 | 0.83 | — |

Examples of foamed cement densities obtained from mixtures of hydrophobic modified polymers HM 22 and HB1:

| HM 21 concentration (in %) | HB1 concentration (in %) | Foamed cement density (in g/cm$^3$) | Compressive strength (in MPa) |
|---|---|---|---|
| 0.25 | 0 | 1.49 | — |
| 0.21 | 1.0 | 1.84 | 18 |

Figure 3:
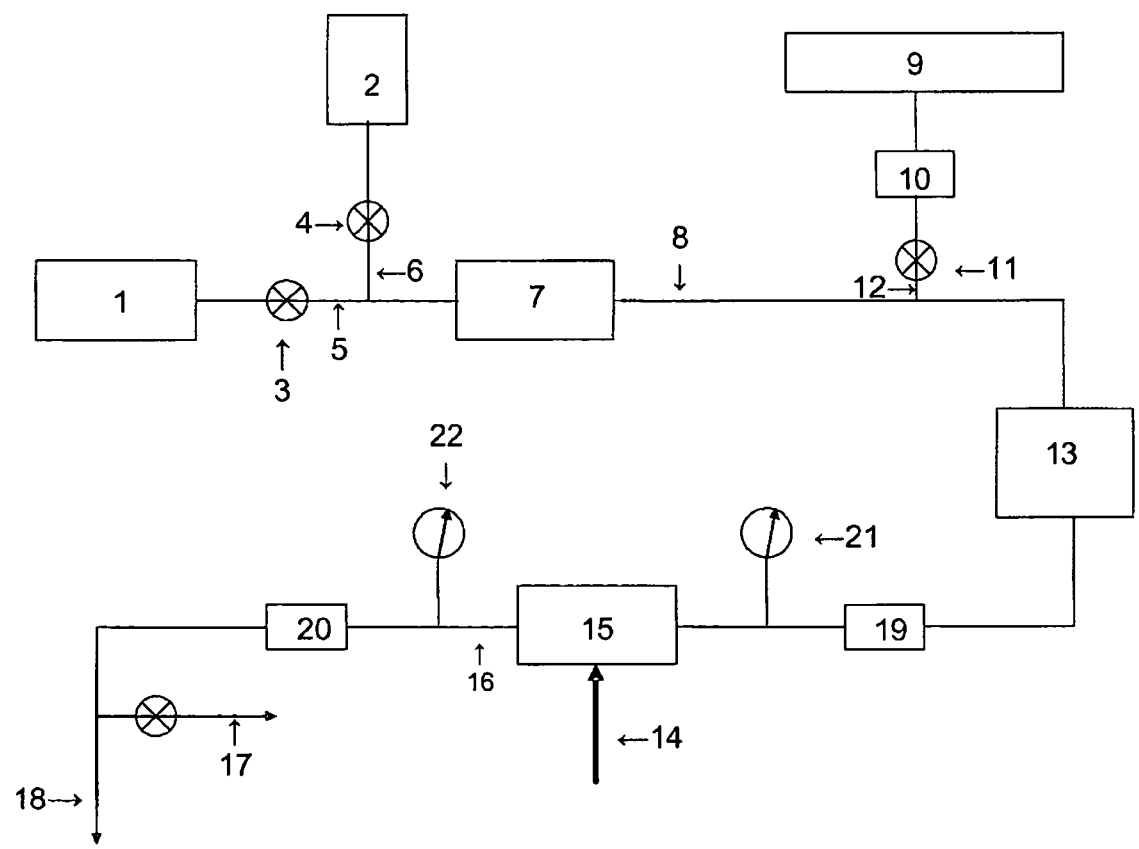

FIG. 3 diagrammatically shows a method of producing a foamed cement slurry according to the invention.

Mixer 7 allows to mix a hydraulic binder coming from bin 1 through line 5 with water coming from tank 2 through line 6. The water may possibly contain thinning agents. Valves 3 and 4 allow to control and to adjust the amounts of water and of hydraulic binder introduced in mixer 7. A homogeneous cement slurry is obtained at the outlet of mixer 7 and flows through line 8.

Tank 9 contains foaming agents: aqueous solutions of hydrosoluble polymers comprising hydrophobic links, or mixtures of such polymers. Foaming agents are injected by means of pump 10, valve 11 and line 12 into the cement slurry circulating in line 8.

The cement slurry comprising foaming agents is pumped by slurry pump 13 until a high pressure ranging for example between 10 and 100 bars is reached.

A gas is then injected into the slurry at high pressure through line 14. The gas can be air or nitrogen. Injection of air into the cement slurry is achieved in foam generator 15 whose function is to stir the slurry and the gas so as to foam the cement slurry. Foam generator 15 can create turbulences in the slurry in different ways known to the man skilled in the art. A foamed cement slurry is obtained at the outlet of foam generator 15 and discharged through line 16.

The foamed cement slurry is either sent into a tank through line 17 or introduced into a well to be cemented through line 18.

Densimeters 19, 20 and pressure detectors 21, 22 allow to control the density and the pressure of the slurry prior to and after foaming.

The invention claimed is:

1. A method of producing a foamed cement slurry, wherein the following stages are carried out:
   mixing a hydraulic binder with water so as to obtain a cement slurry, the hydraulic binder being selected from the group consisting of class G Portland cements, class H Portland cements, aluminous cements whose alumina content is at least above 30% by mass, sulfoaluminous cements and plasters, and the proportion of water ranges between 0.2% and 20% by mass in relation to the mass of hydraulic binder,
   introducing a foaming agent in the cement slurry, the proportion of foaming agent ranging between 0.2% and 20% by mass in relation to the mass of hydraulic binder, the foaming agent being a hydrosoluble polymer comprising hydrophobic units,
   pumping the cement slurry comprising the foaming agent, and
   injecting, a gas into the cement slurry comprising the foaming agent and stirring the mixture of slurry and of gas so as to foam the slurry and to obtain a foamed cement slurry.

2. A method as claimed in claim 1, wherein the hydrosoluable polymer is a polymer with hydrophilic units Hy and hydrophobic units Hb containing C1 to C30 alkyl, aryl, alkylaryl groups.

3. A method as claimed in claim 2, wherein the hydrosoluble polymer has a molecular mass of between $10^4$ and $5\times10^6$ daltons and a proportion of hydrophobic units Hb ranging between 0.5 and 60%.

4. A method as claimed in claim 1, wherein the foaming agent is a mixture of hydrosoluble polymers comprising hydrophobic units.

5. A method as claimed in claim 1, wherein the cement slurry further comprises a hydrosoluble polymer thinning agent whose proportion ranges between 0.1% and 8% by mass in relation to the mass of hydraulic binder, the hydrosoluble polymer thinning agent being selected from the group consisting of: a polynaphthalene sulfonate, a polycarboxylate and a polyoxyethylene polycarboxylate.

6. A method as claimed in claim 1, wherein the proportion of water ranges between 35% and 50% by mass in relation to the mass of hydraulic binder.

7. A method as claimed in claim 1, wherein the cement slurry further comprises a retarding agent for controlling the setting time of the slurry.

8. A method as claimed in claim 1, wherein the cement slurry further comorises an accelerating agent for controlling the setting time of the slurry.

9. A method as claimed in claim 1, further comprising cementing an oil well with the foamed cement slurry.

* * * * *